United States Patent
Yeh et al.

(10) Patent No.: US 7,926,365 B2
(45) Date of Patent: Apr. 19, 2011

(54) ARRAY TYPE PRESSURE SENSING APPARATUS AND PRESSURE MEASUREMENT METHOD USING THE SAME

(75) Inventors: Shao-Hsing Yeh, Hsinchu (TW); Yu-Tang Shen, Tainan (TW)

(73) Assignee: Industrial Technology Research Institute, Hsin-Chu (TW)

( * ) Notice: Subject to any disclaimer, the term of this patent is extended or adjusted under 35 U.S.C. 154(b) by 203 days.

(21) Appl. No.: 12/370,033

(22) Filed: Feb. 12, 2009

(65) Prior Publication Data
US 2010/0037709 A1 Feb. 18, 2010

(30) Foreign Application Priority Data
Aug. 13, 2008 (TW) .............................. 97130787 A

(51) Int. Cl.
*G01D 7/00* (2006.01)
(52) U.S. Cl. ..................................... 73/862.046; 73/760
(58) Field of Classification Search .............. 73/862.041–862.046
See application file for complete search history.

(56) References Cited

U.S. PATENT DOCUMENTS

| | | | |
|---|---|---|---|
| 5,010,772 A | 4/1991 | Bourland et al. | |
| 5,159,159 A | 10/1992 | Asher | |
| 5,505,072 A | 4/1996 | Oreper | |
| 5,905,209 A | 5/1999 | Oreper | |
| 6,155,120 A * | 12/2000 | Taylor | 73/862.046 |
| 6,543,299 B2 * | 4/2003 | Taylor | 73/862.046 |
| 2009/0284398 A1 * | 11/2009 | Shen et al. | 341/33 |
| 2009/0293631 A1 * | 12/2009 | Radivojevic | 73/774 |

FOREIGN PATENT DOCUMENTS
TW 351990 2/1999
* cited by examiner

*Primary Examiner* — Max Noori
(74) *Attorney, Agent, or Firm* — Tim Tingkang Xia; Morris, Manning & Martin, LLP

(57) ABSTRACT

An array type pressure sensing apparatus suitable for multi-touch sensing and pressure quantification for gray scale identification is provided. The array type pressure sensing apparatus includes a plurality of first axes, a plurality of second axes, a plurality of piezoresistive units, a third axis, a plurality of standard resistors and a control unit. The second axes are disposed crisscross with the first axes, and there is one piezoresistive unit disposed on the cross between one first axis and one second axis. The third axis is disposed crisscross with the first axes, and there is one standard resistor on the cross between one first axis and the third axis. A pressure measurement method implemented using the array type pressure apparatus is also provided. The pressure measurement method is a gray scale identification method by pressure quantification of a linear piezoresistive system.

10 Claims, 15 Drawing Sheets

ARRAY TYPE PRESSURE SENSING APPARATUS AND PRESSURE MEASUREMENT METHOD USING THE SAME

CROSS-REFERENCE TO RELATED APPLICATIONS

This application claims priority under 35 U.S.C. §119(a) to Patent Application No. 097130787 filed in Taiwan on Aug. 13, 2008, the entire contents of which are hereby incorporated by reference.

BACKGROUND OF THE INVENTION

1. Field of the Invention

The present invention generally relates to a pressure sensing apparatus and a pressure measurement method using the same and, more particularly, to an array type pressure sensing apparatus and a pressure measurement method using the array type pressure sensing apparatus.

2. Description of the Prior Art

With the development in technology, the pressure sensing apparatus has been widely used in the daily lives. For example, Tekscan has used gray-scale pressure sensing in home care identification and mat pressure sensing. Quantization of touch reception for biomimetic electronic skin has been provided. The resistive touch panel has been commercialized. In consumer electronics, multi-touch technology developed by Apple and Nintendo's Wii Fit have built milestones in pressure sensing. Therefore, large-area multi-touch, array type, 3-D pressure identification will be the mainstream of future home care sensing and consumer electronics.

The conventional pressure sensing apparatus for medical or analytical purpose has been disclosed in, for example, U.S. Pat. No. 5,905,209 and Taiwan Patent No. 351990. In Taiwan Patent No. 351990, a plurality of independent pressure sensing units are disposed at the bottom of a shoe. The voltage signal of each pressure sensing unit is acquired by complicated circuitry. For a single shoe, at least 24 pressure sensing units are disposed with complicated read-out circuitry. If large-area sensing is required, the number of pressure sensing units has to be increased, which leads to high hardware cost and difficulty in manufacturing sensing devices on a large area.

Moreover, in U.S. Pat. No. 5,010,772, the array type capacitive sensing device is manufactured in a mattress shape to sense the pressure from a human body on the mattress. However, the scanning and driving architecture is easily affected by the leakage current due to minimal capacitive charge storage to cause error sensing and error identification in scanning and driving of the array type capacitive sensing device. Moreover, an additional correction circuit is required to correct the pressure corresponding to capacitance variation because of low precision in electric signals corresponding to pressure by the charge amplification sensing architecture.

The conventional multi-touch pressure sensing apparatus is disclosed, for example, in U.S. Pat. No. 5,505,072. The dynamic response scanning circuit in the array type pressure sensing device uses test signals with reference to voltage feedback to realize sensitivity and spatial resolution sensing. Moreover, the test scanning signal is controlled to scan the active region of the array type pressure sensing device. When the piezoresistive sensors are restructured due to an applied pressure, the sensing circuit picks up electric signals from the respective piezoresistive sensors. These electric signals are generated from voltage variations due to resistance variations in the re-structured sensors. A pressure gradient distribution over the respective sensors can be obtained from the above. However, in this method, the driving method for the sensing circuit and its algorithm are too complicated, further leading to delay in calculation of pressure variations.

The conventional touch sensor is disclosed, for example, in U.S. Pat. No. 5,159,159. The 2-D positioning and pressure sensing circuit of the touch sensor uses an array type resistive sensor with crisscross x-axis and y-axis. In the array type resistive sensor, a resistance-variable piezoresistive material is inter-layered. By constant current driving and scanning or constant voltage driving and scanning, touch positioning and pressure gray scale identification can be realized. However, resistive multi-touch positioning and multi-touch pressure gray scale identification cannot be realized by the above constant current driving and scanning or constant voltage driving and scanning based on the x-axis and y-axis.

FIG. 1A is an explosion view of a conventional array type pressure sensing apparatus. Referring to FIG. 1A, the conventional array type pressure sensing apparatus 100 comprises a top substrate 110 and a bottom substrate 120 with a plurality of resistive units 130 therebetween. Such an array type resistive touch device 100 has a 3-wire structure. Moreover, three traversal x-axes 112 are disposed on the top substrate 110 and three longitudinal y-axes 122 are disposed on the bottom substrate 120 so that each of 9 piezoresistive units 130 is disposed on the cross between one x-axis 112 and y-axis 122.

Generally, these resistive units are implemented using a sheet resistive unit 130' in the array type pressure sensing apparatus 100' as shown in FIG. 1A'. To make it easily understood, the piezoresistive units 130 in FIG. 1A are used for exemplification.

When the resistive units 130 are not applied with any pressure, resistance balance is achieved on both the x-axes 112 and the y-axes 122. However, when resistive units 130 are applied with a pressure, resistance value variation due to the applied pressure causes resistance unbalance. Under resistance unbalance, zero potential scanning is performed on the x-axes 112 or the y-axes 122 to obtain a voltage matrix on the x direction and a voltage matrix on the y direction. Then, coordinate encoding and coordinate operation are performed on the voltage matrix on the x-axes and the voltage matrix on the y-axes to obtain the coordinate positions and resistance values of these resistive units 130.

In order to better understand the above description, please refer to FIG. 1B, which is a circuit diagram of the array type pressure sensing apparatus in FIG. 1A. Referring to FIG. 1A to FIG. 1B, the x-axes 112 are scanned. More particularly, the x-axes 112a, 112b, 112c are input with voltage signals $\overline{V}$, $2\overline{V}$, $3\overline{V}$, respectively. When the x-axis 112a is input with the $\overline{V}$, the voltages on the y-axes 122 can be measured. For example, on the y-axis 122a, with an equivalent circuit as shown in FIG. 1C, when the x-axis 112a is input with the voltage signal $\overline{V}$, the voltage signal $V_1^1$ on the y-axis 122a can be measured, wherein $R_{11}$ indicates the resistance value of the resistive units 130a and $R_p$ is the overall effective resistance value of the other 8 piezoresistive units.

Similarly, the voltage signal $V_1^2$ and $V_1^3$ can be measured on the y-axes 122b and 122c, respectively. Moreover, when the x-axis 112b is input with the voltage signal $2\overline{V}$, the voltage signals $V_2^1$, $V_2^2$, $V_2^3$ can be measured on the y-axes 122a, 122b and 122c, respectively. When the x-axis 112c is input with the voltage signal $3\overline{V}$, the voltage signals $V_3^1$, $V_3^2$ and $V_3^3$ can be measured on the y-axes 122a, 122b and 122c, respectively. These voltage signals form an x-matrix, shown as follows:

$$[X] = \begin{bmatrix} V_1^1 & V_1^2 & V_1^3 \\ V_2^1 & V_2^2 & V_2^3 \\ V_3^1 & V_3^2 & V_3^3 \end{bmatrix} \quad (1)$$

Similarly, the y-axes 122 are sequentially scanning to measure voltage signals on the x-axes to form a y-matrix. Then, coordinate encoding and coordinate operation can be performed on the x-matrix and the y-matrix to obtain the coordinate positions and resistance values of the resistive units 130.

However, such a method can only be used to sense the position where the pressure is applied on the sensor but fails to precisely provide the pressure values through a pressure distribution of the resistive touch panel. To further acquire the pressure distribution corresponding to precise pressure values, the resolution of the analog-to-digital converter in the micro-controller has to be improved, leading to complicated encoding operation and difficulty in realization of large-area, multi-linear scanning and driving nor high gray-scale pressure identification. Furthermore, the sensitivity of the resistive touch devices cannot be improved.

Therefore, there is need in providing an array type pressure sensing apparatus and a pressure measurement method using the array type pressure sensing apparatus to overcome the above problems.

SUMMARY OF THE INVENTION

The present invention provides an array type pressure sensing apparatus suitable for multi-touch sensing and pressure quantification for gray scale identification. The array type pressure sensing apparatus and standard resistors are manufactured by micro electro mechanical system (MEMS) processing, complementary metal oxide semiconductor (CMOS) processing or printing without additional manufacturing cost.

Moreover, the present invention provides a pressure measurement method using the array type pressure sensing apparatus for pressure quantification for gray scale identification. The pressure measurement method uses a control unit comprising tri-state I/O ports with a high level output, a low level output and a high impedance input to perform scanning and driving on the first axes, the second axes and the third axis. Using such an array type scanning and driving process and standard resistors, a method for quantification for gray scale identification for a linear piezoresistive system ([A][X]=[0]) is provided.

In one embodiment, the present invention provides an array type pressure sensing apparatus suitable for multi-touch sensing and pressure quantification for gray scale identification. The array type pressure sensing apparatus comprises a plurality of first axes, a plurality of second axes, a plurality of piezoresistive units, a third axis, a plurality of standard resistors and a control unit. The second axes are disposed crisscross with the first axes, and there is one piezoresistive unit disposed on the cross between one first axis and one second axis. The piezoresistive unit is capable of exhibiting different resistance values when being applied with different pressures. The third axis is disposed crisscross with the first axes, and there is one standard resistor on the cross between one first axis and the third axis. The standard resistor is capable of exhibiting a constant resistance value (with resistance error less than 1%) when being applied with different pressures. The control unit has a plurality of I/O ports respectively coupled to the first axes, the second axes and the third axis, through which the control unit performs a tri-state logic scanning and driving process on the first axes, the second axes and the third axis. Therefore, the array type pressure sensing apparatus exhibits at least the following advantages:

1. Realization of multi touch;
2. Realization of large-area scanning and driving that is not available for resistive touch devices; and
3. Improvement in high gray scale identification and high resolution touch sensing for large-area array type touch devices.

In another embodiment, the present invention provides a pressure measurement method suitable for pressure sensing using the array type pressure sensing apparatus as recited in claim 1, the pressure measurement method comprising: measuring voltage signals of the piezoresistive units and the standard resistor corresponding to each first axis; forming a voltage dividing matrix comprising the voltage signals of the piezoresistive units and the standard resistor corresponding to each first axis; forming a conductance matrix comprising inverses of resistance values of the piezoresistive units and the standard resistor, resulting in a product of the voltage dividing matrix and the conductance matrix being a zero matrix to form a set of piezoresistive simultaneous equations; and solving the set of piezoresistive simultaneous equations to acquire the resistance values of the piezoresistive units.

BRIEF DESCRIPTION OF THE DRAWINGS

The objects, spirits and advantages of the embodiments of the present invention will be readily understood by the accompanying drawings and detailed descriptions, wherein.

DETAILED DESCRIPTION OF THE PREFERRED EMBODIMENT

The present invention can be exemplified but not limited by the embodiments as described hereinafter.

Figure 1A:
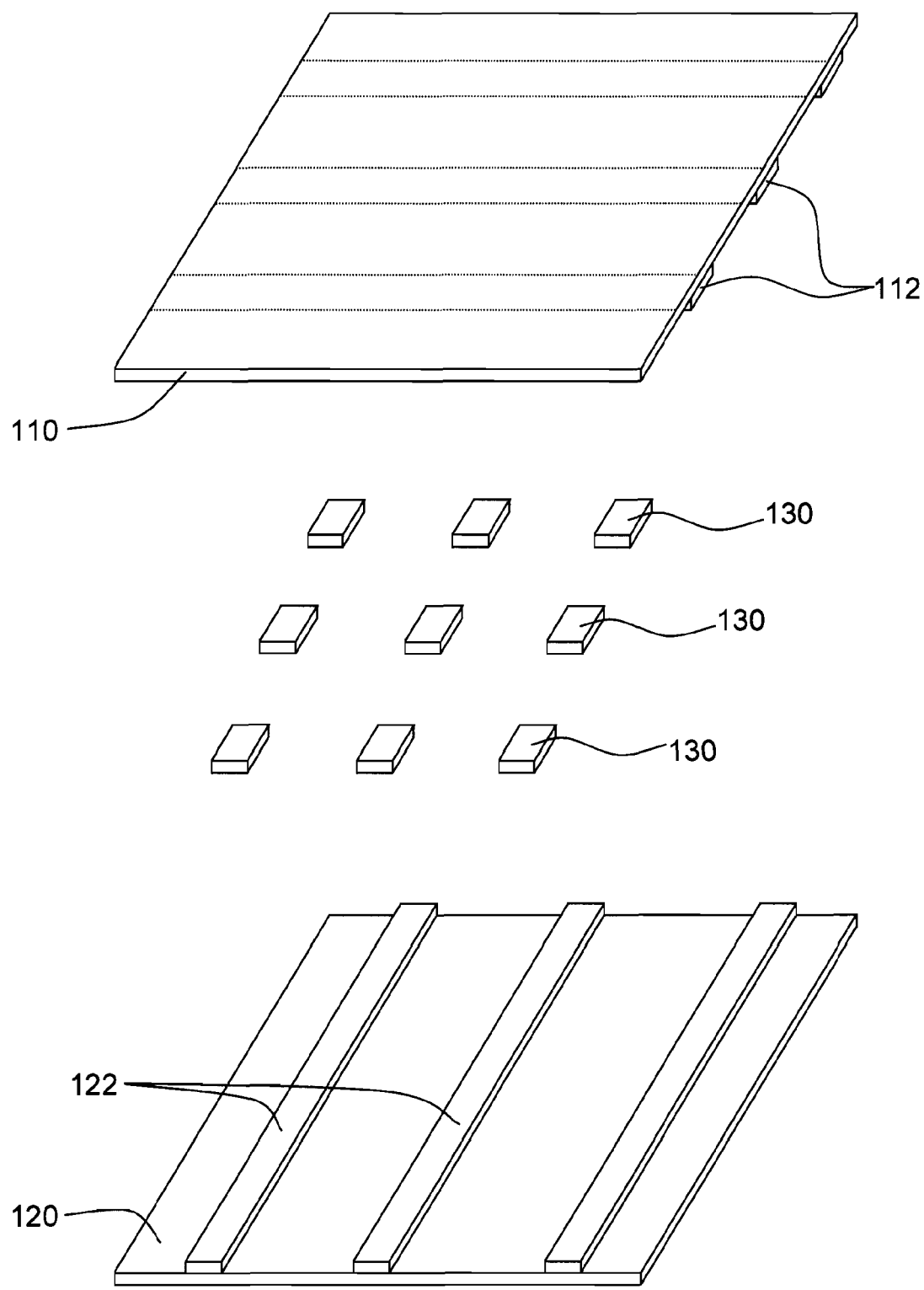
FIG. 1A and FIG. 1A' are explosion views of two conventional array type pressure sensing apparatuses.
Figure 1A:
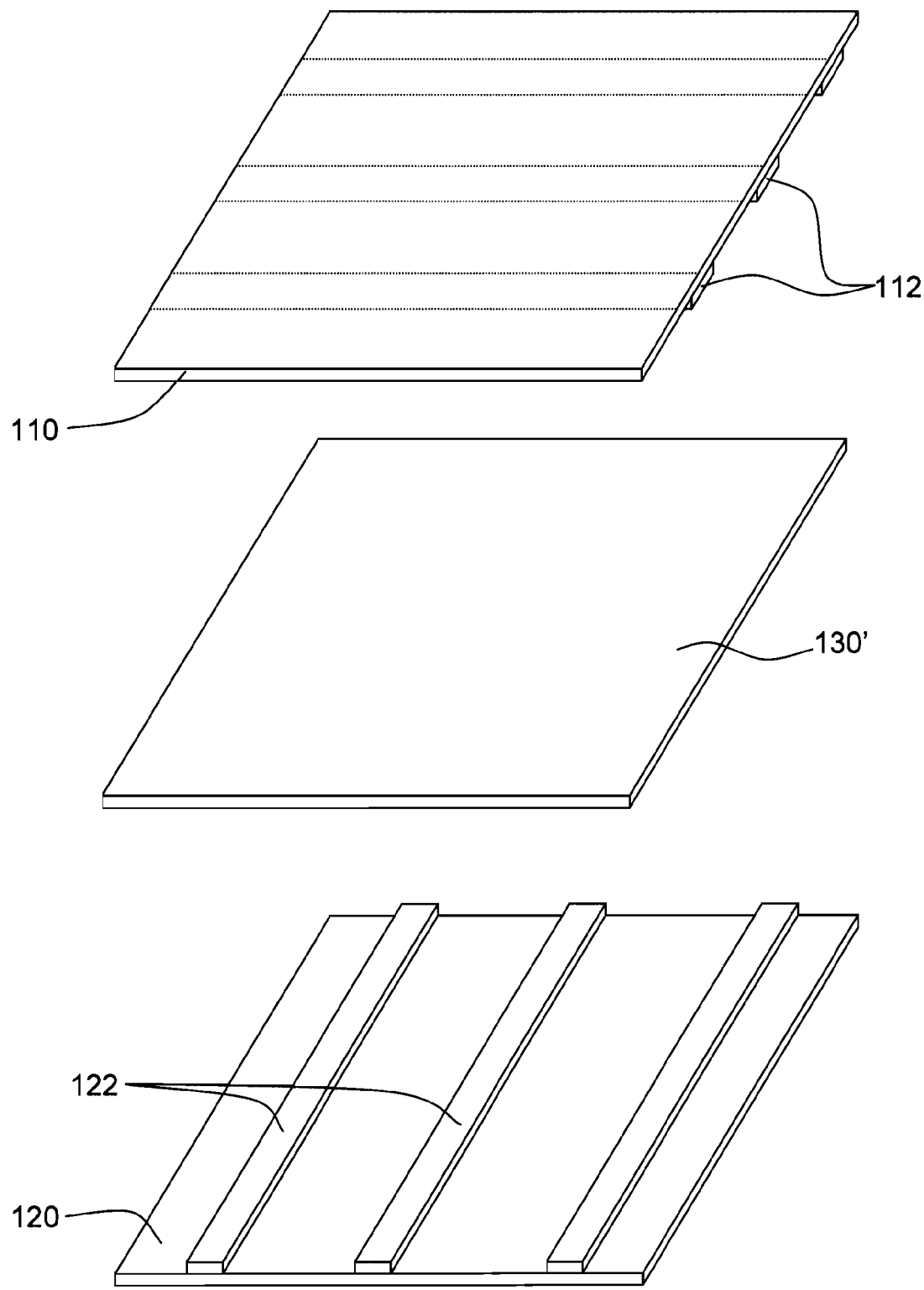
Figure 1C:
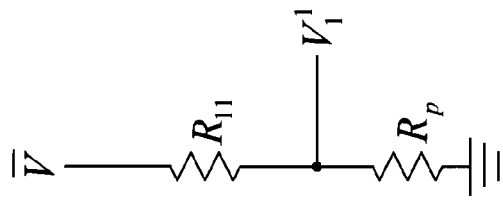
FIG. 1C is an equivalent circuit of part of the array type pressure sensing apparatus in FIG. 1A.
Figure 1B:
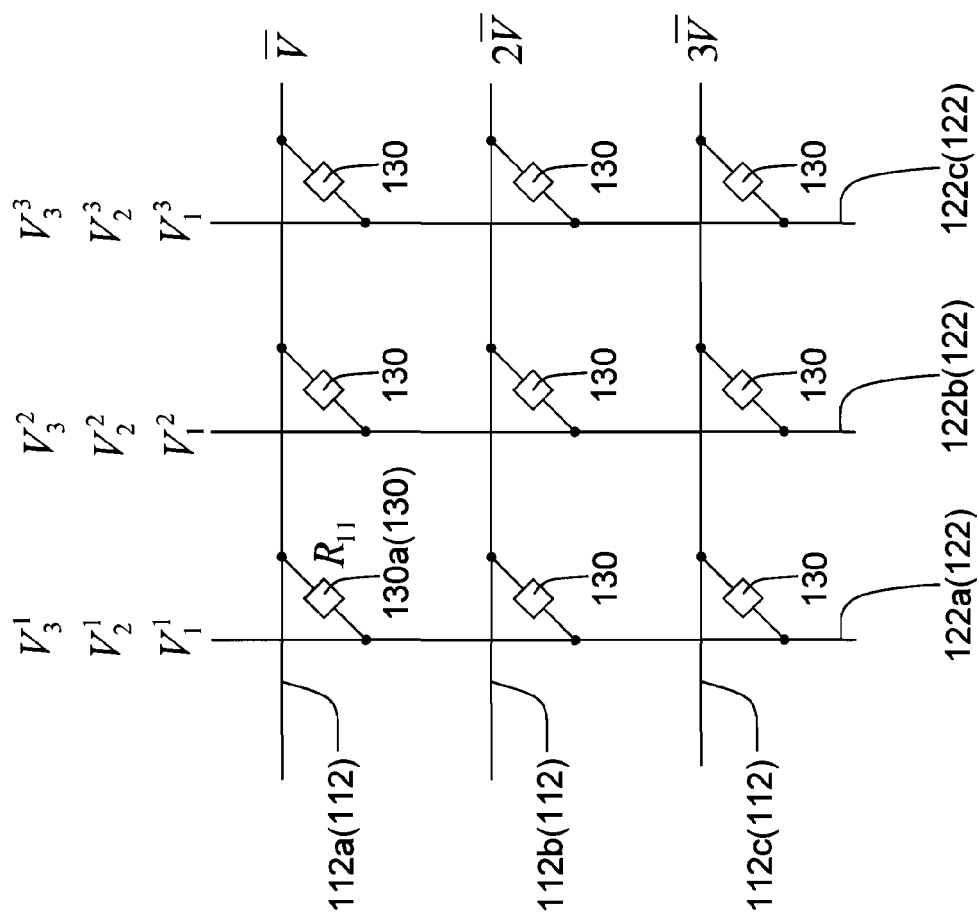
FIG. 1B is a circuit diagram of the array type pressure sensing apparatus in FIG. 1A.
Figure 2:
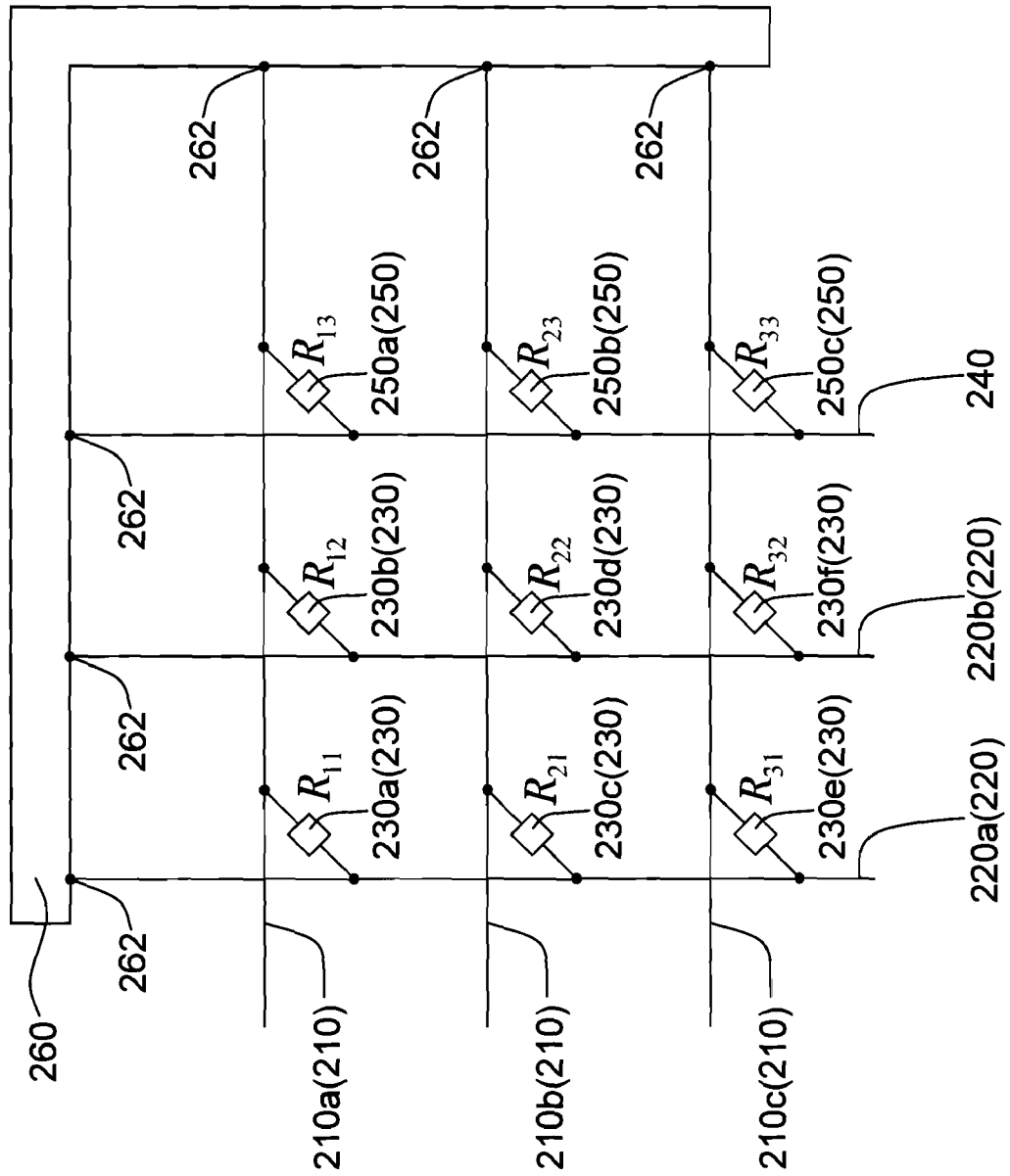
FIG. 2 is a schematic diagram of an array type pressure identification system according to one embodiment of the present invention.

FIG. 2 is a schematic diagram of an array type pressure identification system according to one embodiment of the present invention. To make it brief, FIG. 2 shows a circuit diagram of 3-wire multi-touch device. Referring to FIG. 2, the array type pressure sensing apparatus 200 of the present invention comprises a plurality of first axes 210 (210a, 210b, 210c), a plurality of second axes 220 (220a, 220b), a plurality of piezoresistive units 230, a third axis 240, a plurality of standard resistors 250 and a control unit 260. The first axes 210 can be exemplified by a plurality of row metal wires (like the conventional x-axes). The second axes 220 can be exemplified by a plurality of column metal wires (like the conventional y-axes). The first axes 210 and the second axes 220 disposed perpendicularly crisscross. However, the present invention is not limited to the above arrangement of the first axes 210 and the second axes 22. Those with ordinary skills in the art can make modifications within the scope of the present invention.

Accordingly, the piezoresistive units 230 are coupled to the first axes 210 and the second axes 220 on the cross. In other words, each of the piezoresistive units 230 is disposed on the cross between one first axis 210 and one second axis 220. Generally, the piezoresistive units 230 are open-circuit when they are not applied with a pressure so that no conduction is made between the corresponding first axes 210 and second axes 220. When the piezoresistive units 230 are applied with a pressure, the piezoresistive units 230 are re-structured to become conductive so that a resistive conduction is made between the corresponding first axes 210 and second axes 220. Moreover, the piezoresistive units 230 are capable of exhibiting different resistance values when being applied with different pressures. Since the resistance value depends on the applied pressure, the pressures on all the piezoresistive units 230 can thus be acquired from the resistance values.

It is noted that, in the following description, we only explain how to acquire the resistance values of the piezoresistive units 230. Any one with ordinary skill in the art can easily understand that the resistance values of the piezoresistive units 230 have to be converted into corresponding pressure values. Therefore, the resistance values of the piezoresistive units 230 are equivalent to the applied pressure values. Moreover, when the array type pressure sensing apparatus 200 are scanned, the status of the piezoresistive units 230 can be determined no matter the array type pressure sensing apparatus 200 is applied with a pressure or not. If the piezoresistive units 230 are opened, the piezoresistive units 230 are not applied with any pressure. Therefore, the array type pressure sensing apparatus 200 can be scanned no matter the scanning array type pressure sensing apparatus 200 is applied with a pressure or not.

Similarly, referring to FIG. 2, the third axis 240 can be exemplified by a column metal wire (like the conventional y-axis) to be crisscross with the first axes 210. The standard resistors 250 are disposed on the cross between the first axes 210 and the third axis 240. Since each of the standard resistors 250 has a constant resistance value, the corresponding first axes 210 and the third axis 240 form a resistive conduction. The standard resistors exhibit the same resistance value even under different pressures, temperatures and moistures.

Moreover, the control unit 260 has a plurality of I/O ports 262. These I/O ports 262 are coupled to the first axes 210, the second axes 220 and the third axis 240, respectively. Through the I/O ports 262 the control unit 26 performs a tri-state logic scanning and driving process on the first axes 210, the second axes 220 and the third axis 240.

More particularly, the tri-state logic comprises a high level output, a low level output and a high impedance input based on the angle corresponds to the control unit 260. The high level output or the low level output indicates that the control unit 260 outputs a specific driving signal with a high level or a low level. In the present embodiment, the voltage signal of the high level output is, for example, the driving voltage $V_{drive}$, while the voltage signal of the low level output is, for example, the lowest voltage in the system or the ground. However, the present invention is not limited to these voltage signals. Moreover, the high impedance input indicates that the control unit 260 is input with a specific voltage signal. In other words, the voltage signal is the divided voltage at the I/O port 262 measured by the control unit 260.

The scanning and driving process of the present invention will be described hereinafter with reference to mathematical operation to obtain the resistance value of the piezoresistive units 230. For clearer description, the resistance values of the piezoresistive units 230a, 230b, 230c, 230d, 230e, 230f are denoted by $R_{11}$, $R_{12}$, $R_{21}$, $R_{22}$, $R_{31}$, $R_{32}$; the resistance values of the standard resistors 250a, 250b, 250c are denoted by $R_{13}$, $R_{23}$, $R_{33}$. Generally, when the piezoresistive units 230 are not applied with any pressure, the resistance value is approximately infinity. Moreover, the resistance values of the piezoresistive units 230 are unknown, while the resistance values of the standard resistors 250 are known to be a constant.

In the present embodiment, the first axes 210 (210a, 210b, 210c) are sequentially scanned and, during the scanning of one of the first axes 210, the second axes 220 (220a, 220b) and the third axis 240 are sequentially scanned. By the tri-state logic of the control unit I/O ports, the array type pressure sensing apparatus 200 is scanned and driven.

Figure 3B:
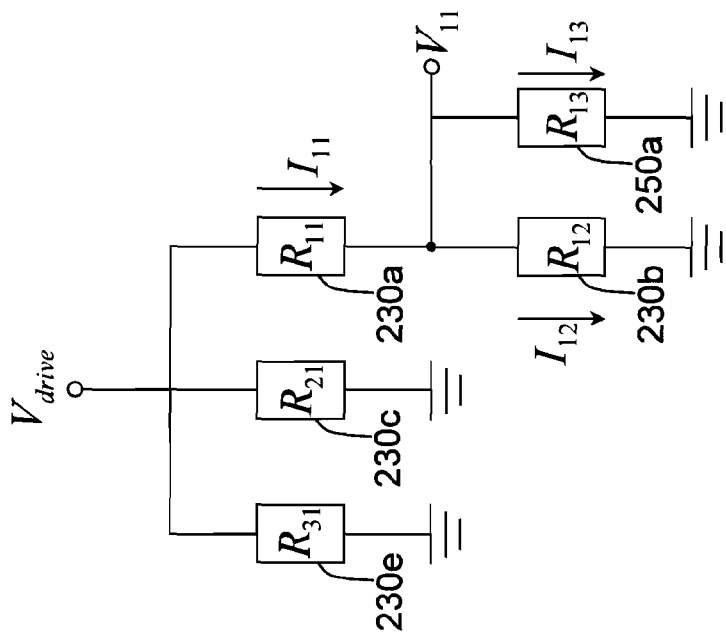
FIG. 3B, FIG. 3D and FIG. 3F are equivalent circuits of FIG. 3A, FIG. 3C, and FIG. 3E, respectively.
Figure 3A:
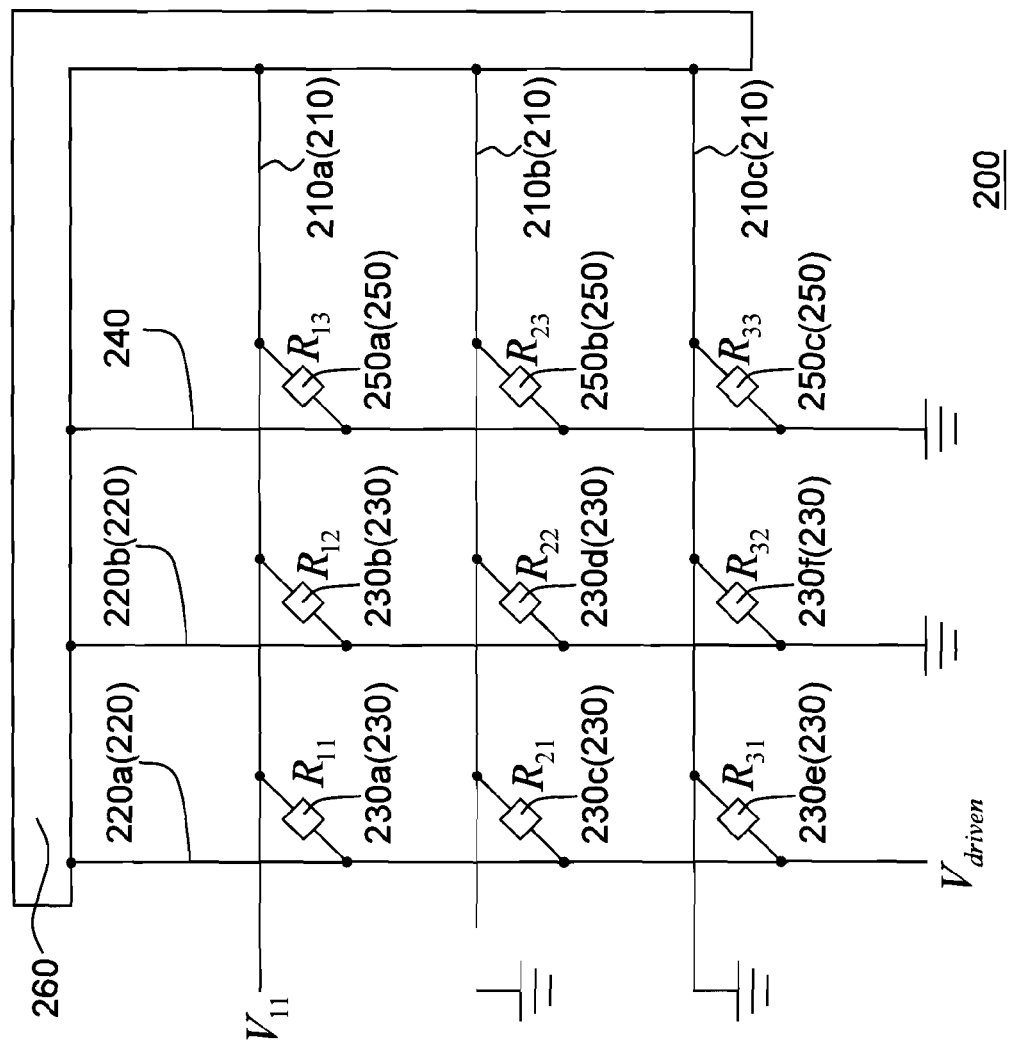
FIG. 3A, FIG. 3C, and FIG. 3E are schematic diagrams wherein the second axes and the third axis are scanned when a first axis is scanned.
Figure 3D:
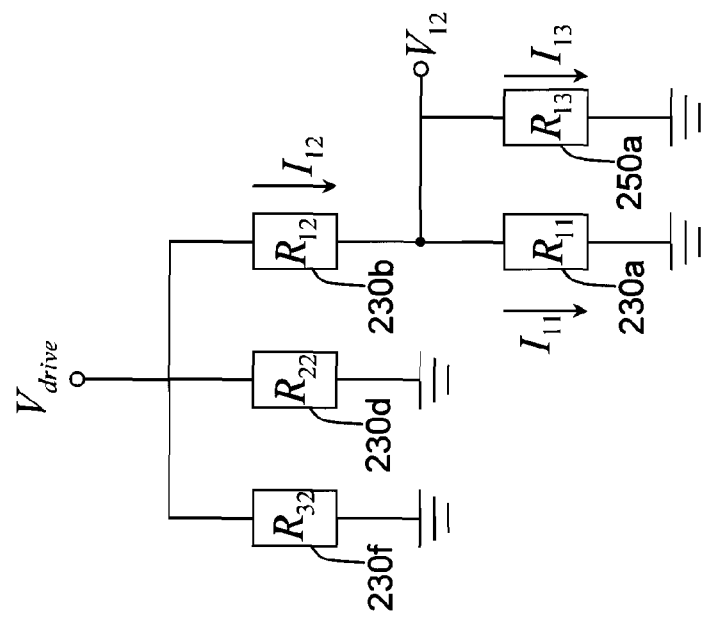
Figure 3C:
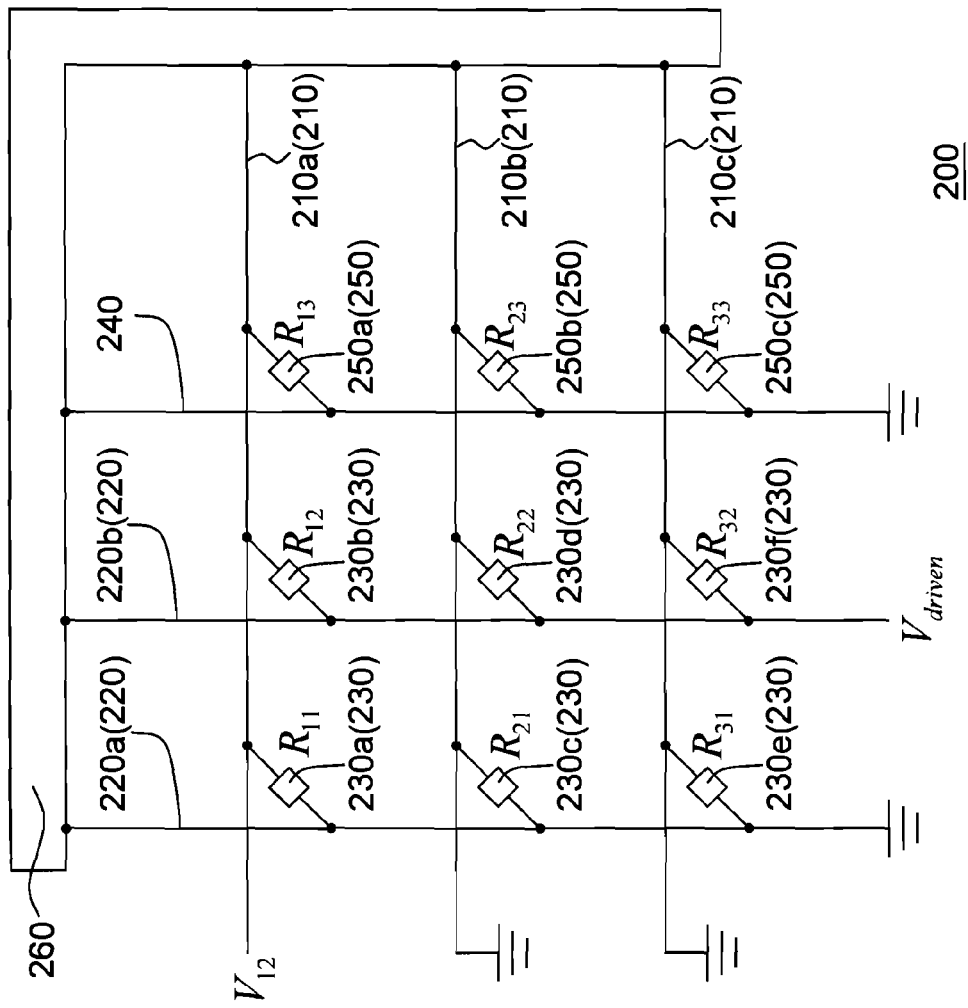
Figure 3F:
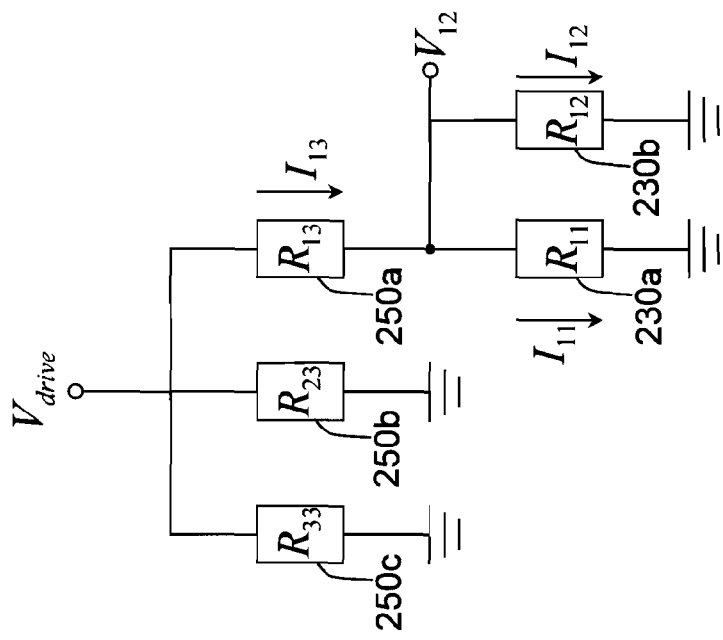
Figure 3E:
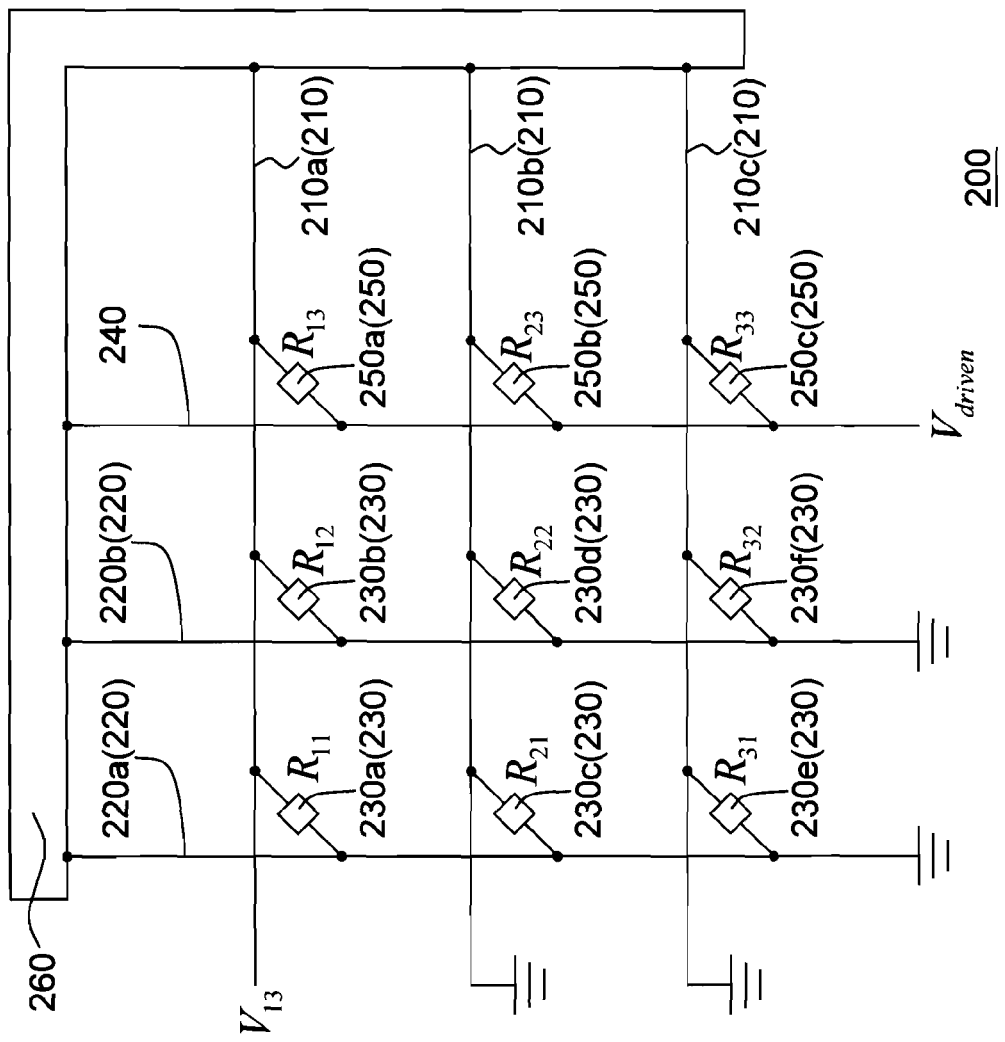

FIG. 3A, FIG. 3C, and FIG. 3E are schematic diagrams wherein the second axes and the third axis are scanned when a first axis is scanned. More particularly, while the first axis 210 is scanned, the second axes 220a, 220b and the third axis 240 are sequentially scanned as shown in FIG. 3A, FIG. 3C, and FIG. 3E. FIG. 3B, FIG. 3D and FIG. 3F are equivalent circuits of FIG. 3A, FIG. 3C, and FIG. 3E, respectively. For clarity, the first axes 210 (210a, 210b, 210c), the second axes 220 (220a, 220b) and the third axis 240 are labeled on an opposite side to the chip 260 so that any one with ordinary skill in the art can easily understand without being confused.

Please refer to FIG. 3A and FIG. 3B, wherein the first axis 210a and the second axis 220a are scanned. In other words, the piezoresistive unit 230a is scanned. The piezoresistive unit 230a corresponds to the first axis 210a and the second axis 220a and is coupled between the first axis 210a and second axis 220a. In FIG. 3A and FIG. 3B, the control unit 260 performs a high impedance input on the first axis 210a, a high level output on the second axis 220a, and the low level output on the remaining first axes 210b, 210c, the remaining second axis 220b and the third axis 240. More particularly, the control unit 260 provides the second axis 220a a driving voltage $V_{drive}$, and grounds the first axes 210b, 210c, the second axis 220b and the third axis 240 so as to measure a divided voltage signal $V_{11}$ corresponding to the piezoresistive unit 230a.

The equivalent circuit for scanning and driving the piezoresistive unit 230a is shown in FIG. 3B. The driving voltage $V_{drive}$ forms a voltage-dividing loop with the piezoresistive unit 230a connected in series with the piezoresistive unit 230b and the standard resistor 250a connected in parallel. Moreover, according to Kirchhoff's Current Law, the relation between the current $I_{11}$ passing through the piezoresistive unit 230a, the current $I_{12}$ passing through the piezoresistive unit 230b and the current $I_{13}$ passing through the standard resistor 250a can be expressed by an equation as follows:

$$I_{11} = I_{12} + I_{13} \quad (2)$$

wherein $$I_{11} = (V_{drive} - V_{11})/R_{11},\ I_{12} = (V_{11} - 0)/R_{12},\ I_{13} = (V_{11} - 0)/R_{13}$$

Equation (2) can be re-written as:

$$(V_{drive} - V_{11}) \times \frac{1}{R_{11}} + (-V_{11}) \times \frac{1}{R_{12}} + (-V_{11}) \times \frac{1}{R_{13}} = 0 \quad (3)$$

wherein the driving voltage $V_{drive}$ and resistance value $R_{13}$ are known by setting, the voltage signal $V_{11}$ is known by measuring, and the resistance values $R_{11}$, $R_{12}$ are to be determined.

Then, please refer to FIG. 3C and FIG. 3D, wherein the first axis 210a and the second axis 220b are scanned. Similarly, the control unit 260 provides the second axis 220b a driving voltage $V_{drive}$, and grounds the first axes 210b, 210c, the second axis 220a and the third axis 240 so as to measure a divided voltage signal $V_{12}$ corresponding to piezoresistive unit 230b.

The equivalent circuit for scanning the piezoresistive unit 230b is shown in FIG. 3D. The driving voltage $V_{drive}$ forms a voltage-dividing loop with the piezoresistive unit 230b connected in series with the piezoresistive unit 230a and the standard resistor 250a connected in parallel. Moreover, according to Kirchhoff's Current Law, we obtain:

$$(-V_{12}) \times \frac{1}{R_{11}} + (V_{drive} - V_{12}) \times \frac{1}{R_{12}} + (-V_{12}) \times \frac{1}{R_{13}} = 0 \quad (4)$$

Then, please refer to FIG. 3E and FIG. 3F, wherein the first axis 210a and the third axis 240 are scanned. In other words, the standard resistor 250a is scanned. In FIG. 3E and FIG. 3F, the control unit 260 performs a high impedance input on the first axis 210a, a high level output on the third axis 240, and the low level output on the remaining first axes 210b, 210c and the second axes 220a, 220b. More particularly, the control unit 260 provides the third axis 240 a driving voltage $V_{drive}$, and grounds the first axes 210b, 210c and the second axes 220a, 220b so as to measure a divided voltage signal $V_{13}$ corresponding to the standard resistor 250a.

The equivalent circuit for scanning the standard resistor 250a is shown in FIG. 3F. The driving voltage $V_{drive}$ forms a voltage-dividing loop with the standard resistor 250a connected in series with the piezoresistive units 230a, 230b connected in parallel. Moreover, according to Kirchhoff's Current Law, we obtain:

$$(-V_{13}) \times \frac{1}{R_{11}} + (-V_{13}) \times \frac{1}{R_{12}} + (V_{driven} - V_{13}) \times \frac{1}{R_{13}} = 0 \quad (5)$$

Referring to Equation (3), Equation (4) and Equation (5), a matrix is used to represent a set of piezoresistive simultaneous equations containing the above equations. In other words, in the present invention, a voltage dividing matrix [A] containing divided voltage signals of the piezoresistive units 230a, 230b and the standard resistor 250a and a conductance matrix [X] containing inverses of resistance values of the piezoresistive units 230a, 230b and the standard resistor 250a can be constructed so that the product of the voltage dividing matrix [A] and conductance matrix [X] is equal to a zero matrix [0] to represent the set of piezoresistive simultaneous equations. More particularly, the relation between the voltage dividing matrix [A] and the conductance matrix [X] can be expressed as:

$$[A] = \begin{bmatrix} V_{drive} - V_1 & -V_1 & -V_1 \\ -V_2 & V_{drive} - V_2 & -V_2 \\ -V_3 & -V_3 & V_{drive} - V_3 \end{bmatrix} \quad (6)$$

$$[X] = \begin{bmatrix} \frac{1}{R_{11}} \\ \frac{1}{R_{12}} \\ \frac{1}{R_{13}} \end{bmatrix} \quad (7)$$

$$[A][X] = [0] \quad (8)$$

Generally, if the resistance value $R_{13}$ of the standard resistor 250a is unknown, the Equation (8) representing the set of piezoresistive simultaneous equations will result in infinite solutions because the number of dimensions is too large. However, in the present invention, the resistance value $R_{13}$ of the standard resistor 250a is pre-determined so as to reduce the number of dimensions by one to solve the solutions for the resistance values $R_{11}$, $R_{12}$ of the piezoresistive units 230a, 230b.

In the present embodiment, the set of piezoresistive simultaneous equations in Equation (8) can be solved using Gaussian elimination with a known parameter (250a). More particularly, the voltage dividing matrix [A] is reduced to an upper triangular matrix so that the resistance values $R_{11}$, $R_{12}$ of the piezoresistive units 230a, 230b can be obtained. However, the present invention is not limited to Gaussian elimination, as is easily understand by anyone with ordinary skill in the art.

It is noted, in the present embodiment, an array type pressure sensing apparatus is used as an example where the voltage dividing matrix [A] is a 3×3 matrix. According to the present invention, the calculated resistance value has an error within 5%. For the prior art array type piezoresistive sensing device, a complicated constant current negative feedback circuit is required to perform scanning and driving, monitor the current passing through the resistive sensors, and achieve driving the resistive sensors. In the present invention, the large-area array type pressure sensing apparatus achieves improved scanning and driving, and minimize the error in pressure quantification for gray scale identification.

More particularly, the error in the present invention mainly results from identification error due to the resistance value of the standard resistors 250 (1% precision), the precision of the analog-to-digital converter (ADC) (10-bit precision) of the control unit 260 and the drivability of the I/O ports 262 (25 mA). The approaches to enhance identification precision are presented hereinafter.

1. Use standard resistors with smaller error to improve the gray scale identification precision.
2. Use a control unit comprising ADC with higher precision to reduce error in signal measuring.
3. Use a buffer circuit to enhance the drivability of the I/O port s of the control unit so that the I/O ports exhibit sufficient drivability to drive the array type piezoresistive units.

Moreover, in the present invention, once a specific row of first axes 210 (210a, 210b, 210c) are scanned, the resistance values of the piezoresistive units 230 corresponding to each of the first axes 210 can be obtained. Compared to the prior art wherein all the rows of axes are scanned before further calculations, the present invention achieves multi-touch sensing and real-time operation.

Referring to FIG. 2, the first axis 210b and the first axis 210c are scanned after the first axis 210a is scanned. The first axes 210b, 210c are scanned in the same way as the first axis 210a is scanned. Thus, detailed description thereof is not repeated. When all the first axes 210 are scanned, the array type pressure sensing apparatus 200 is scanned. Then, a pressure distribution of the array type pressure sensing apparatus 200 can be obtained once the array type pressure sensing apparatus 200 is scanned.

Figure 4:
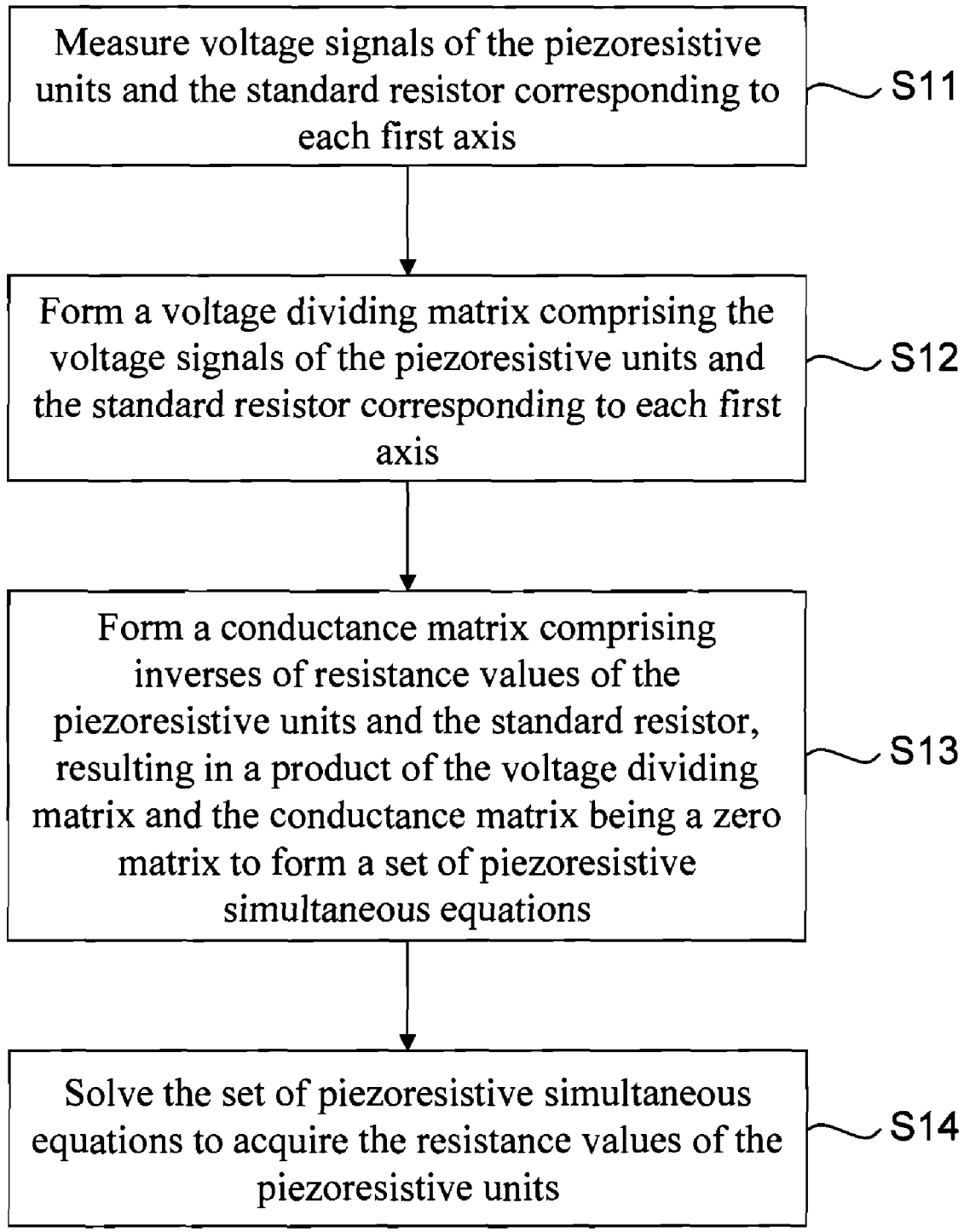
FIG. 4 is a flowchart of a pressure measurement method according to one embodiment of the present invention.

Even though the pressure measurement method corresponding to the array type pressure sensing apparatus 200 has been presented while the scanning process of the array type pressure sensing apparatus 200 is described, FIG. 4 depicts a flowchart of a pressure measurement method according to one embodiment of the present invention to make it easily understood by anyone with ordinary skill in the art. It should be noted that the pressure measurement method of the present invention is not only suitable for the array type pressure sensing apparatus 200 in the previous embodiment, but also suitable for other array type pressure sensing apparatuses within the scope of the present invention.

Referring to FIG. 4 and FIG. 3A to FIG. 3E, in Step S111, voltage signals of the piezoresistive units and the standard resistors corresponding to each first axis are measured. In the present embodiment, the first axis 210a, the piezoresistive units 230a, 230b and the standard resistor 250a corresponding to the first axis 210a are taken for example. In this case, divided voltage signals $V_{11}$, $V_{12}$ of the piezoresistive units 230a, 230b and divided voltage signal $V_{13}$ of the standard resistor 250a are measured. The divided voltage signals $V_{11}$, $V_{12}$ of the piezoresistive units 230a, 230b can be measured as previously stated. The first axis 210a is performed with a high impedance input, while the remaining first axes 210b, 210c experience a low level output. One second axis 220 is performed with a high level output, while the remaining second axis 220 and the third axis 240 experience a low level output. In FIG. 3A, the second axes 220a is performed with a high level output, while the second axes 220b and the third axis 240 experience a low level output to measure the divided voltage signal $V_{11}$ of the piezoresistive unit 230a corresponding to the second axis 220a. In FIG. 3C, the second axis 220b is performed with a high level output, while the second axis 220a and the third axis 240 experience a low level output to measure divided voltage signal $V_{12}$ of the piezoresistive unit 230b corresponding to the second axis 220b.

The voltage signal $V_{13}$ of the standard resistor 250a can be measured as previously stated. In FIG. 3E, the first axis 210a is performed with a high impedance input, while the remaining first axes 210b, 210c undergo a low level output, the third axis 240 undergoes a high level output, and the second axes 220a, 220b experience a low level output to measure the divided voltage signal $V_{13}$ of the standard resistor 250a.

Please further refer to FIG. 4, in Steps S12 to S13, a voltage dividing matrix [A] containing the divided voltage signals $V_{11}$, $V_{12}$ of the piezoresistive units 230a, 230b and the divided voltage signal $V_{13}$ of the standard resistor 250a and a conductance matrix [X] containing inverses of the resistance values of the piezoresistive units 230a, 230b and the standard resistor 250a can be constructed (expressed as Equation (6) and Equation (7)) so that the product of the voltage dividing matrix [A] and conductance matrix [X] is equal to a zero matrix [0] (as Equation (8)) to represent the set of piezoresistive simultaneous equations (as Equation (3) to Equation (5)). Finally, as in Step S14, the set of piezoresistive simultaneous equations is solved to acquire the resistance values $R_{11}$, $R_{12}$ of the piezoresistive units 230a, 230b.

In the present invention, the voltage dividing matrix is constructed when one first axis is scanned and driven. The order of the voltage dividing matrix depends on the number of the second axes and the third axis. In other words, the present invention is not limited to the case where the number of the first axes is equal to the number of the second axes and the third axis. Other cases will be presented hereinafter with references to accompanying drawings to describe the pressure measurement method of the present invention pressure.

Figure 5:
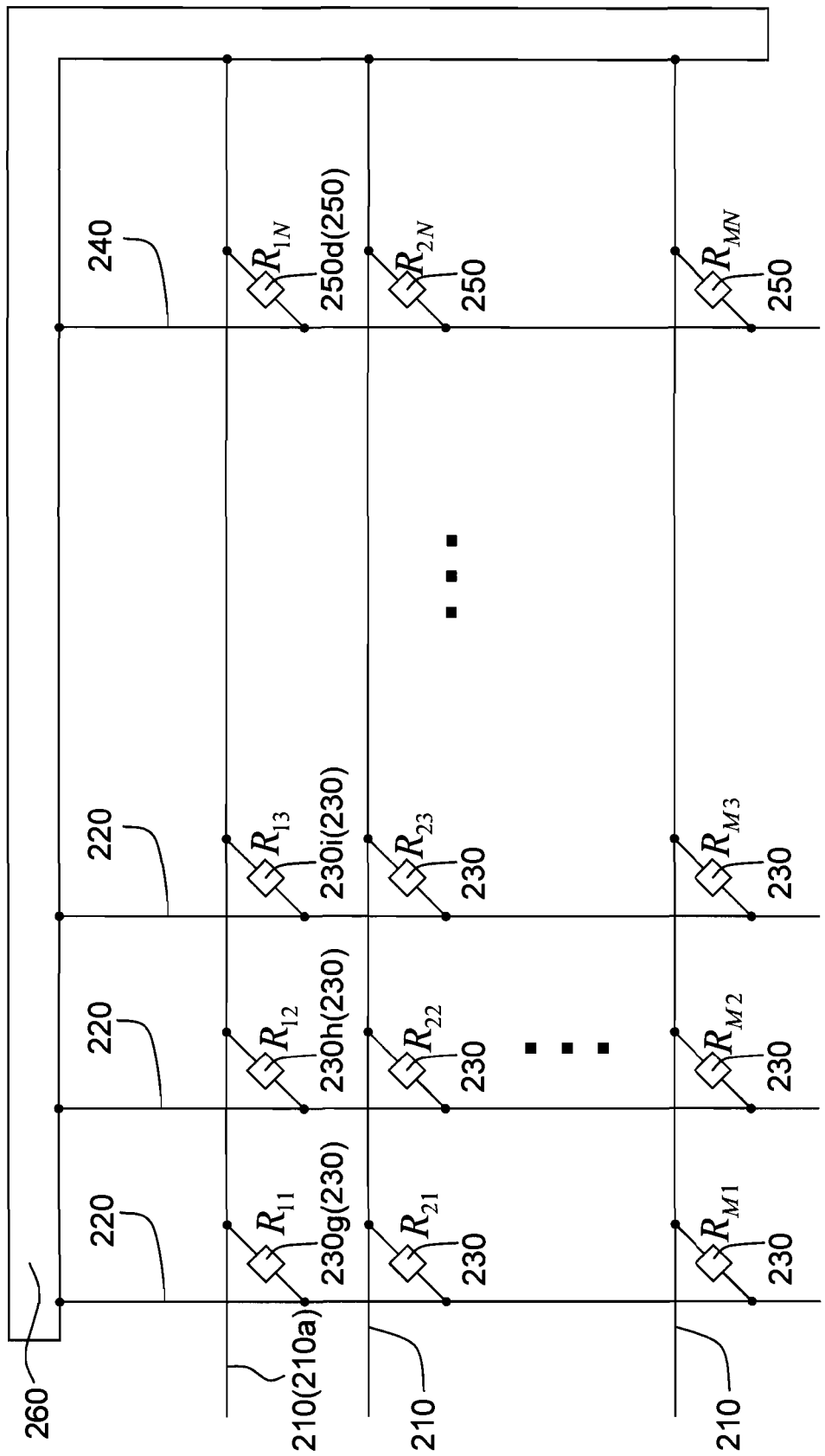
FIG. 5 a schematic diagram of an array type pressure identification system according to another embodiment of the present invention.

FIG. 5 a schematic diagram of an array type pressure identification system according to another embodiment of the present invention. In FIG. 5, the array type pressure sensing apparatus 200a of the present embodiment is similar to the array type pressure sensing apparatus 200 in FIG. 2 except that the number of the first axes 210 and the second axes 220 is not the same. More particularly, in the present embodiment, the number of the first axes 210 is M, while the number of the second axes 220 is N−1, resulting in the total number of the second axes 220 and the third axis 240 is N.

In this case, the voltage dividing matrix [A] is a N×N matrix and the conductance matrix [X] is a N×1 matrix. Moreover, each entry in the voltage dividing matrix [A] can be represented as Aij, wherein i, j denote the ordinal numbers of the row and the column. Each entry in the conductance matrix [X] can be represented as Xi, wherein i is the ordinal number of the row.

Taking the first axis 210a for example, the voltage dividing matrix [A] and the conductance matrix [X] can be expressed as:

$$[A] = \begin{bmatrix} A_{11} & A_{12} & A_{13} & \cdots & A_{1N} \\ A_{21} & A_{22} & A_{23} & \cdots & A_{2N} \\ A_{31} & A_{32} & A_{33} & \cdots & A_{3N} \\ \vdots & \vdots & \vdots & \ddots & \vdots \\ A_{N1} & A_{N2} & A_{N3} & \cdots & A_{NN} \end{bmatrix} \quad (9)$$

$$= \begin{bmatrix} V_{drive} - V_{11} & -V_{11} & -V_{11} & \cdots & -V_{11} \\ -V_{12} & V_{drive} - V_{12} & -V_{12} & \cdots & -V_{12} \\ -V_{13} & -V_{13} & V_{drive} - V_{13} & \cdots & -V_{13} \\ \vdots & \vdots & \vdots & \ddots & \vdots \\ -V_{1N} & -V_{1N} & -V_{1N} & \cdots & V_{drive} - V_{1N} \end{bmatrix}$$

$$[X] = \begin{bmatrix} X_1 \\ X_2 \\ X_3 \\ \vdots \\ X_N \end{bmatrix} = \begin{bmatrix} \frac{1}{R_{11}} \\ \frac{1}{R_{12}} \\ \frac{1}{R_{13}} \\ \vdots \\ \frac{1}{R_{1N}} \end{bmatrix} \quad (10)$$

wherein $V_{11} \sim V_{13}$ . . . are the voltage signals measured corresponding to the piezoresistive units 230g~230i . . . , $V_{IN}$ is the divided voltage signal measured corresponding to the standard resistor 250d, $R_{11} \sim R_{13}$ . . . are the resistance values of the piezoresistive units 230g~230i . . . , $R_{IN}$ is the resistance value of the standard resistor 250d, $V_{drive}$ is the voltage signal of the high level output, as a driving voltage.

Referring to Equation (9), the entries in each row are identical except the entry on the diagonal. For the piezoresistive units (from the first row to the second bottom row), each entry in the voltage dividing matrix [A] can be represented as $A_{ij}$ with i between 1~N−1, j between 1~N. When j is not equal to i, entry $A_{ij}$ represents the negative divided voltage signal of the piezoresistive unit corresponding to the first axis in the ith row and the second axis in the jth column; and when j is equal to i, entry $A_{ii}$ represents the driving voltage signal $V_{drive}$ of the high level output minus the divided voltage signal of the piezoresistive unit corresponding to the second axis in the ith column.

For the standard resistor (in the last row), each entry in the Nth row in the voltage dividing matrix [A] is represented by $A_{Nj}$ with j between N. Entry $A_{Nj}$ represents the negative divided voltage signal of the standard resistor 250d when j is not equal to N. Entry $A_{NN}$ represents the driving voltage signal $V_{drive}$ of the high level output minus the voltage signal $V_{IN}$ of the standard resistor 250d when j is equal to N.

Referring to Equation (10), each entry in the conductance matrix [X] is represented by $X_i$ with i between 1~N. Entry $X_i$ represents the inverse of the resistance value of the piezoresistive unit corresponding to the second axis in the ith row when i is not equal to N. Entry $X_N$ represents the inverse of the resistance value of the standard resistor 250d when i is equal to N.

In the present embodiment, the third axis 240 is disposed on the last column. However, the third axis 240 can be disposed between these second axes 220. The voltage dividing matrix can be easily modified by anyone with ordinary skill in the art according to the previous description.

Moreover, even though the voltage signal of the high level output and the low level output in the present invention are the driving voltage and the ground (zero level), however, the present invention is not limited to these voltage signals. When the voltage signals of the high level output and the low level output are $V_{high}$ and $V_{low}$, respectively, Equation (9) can be re-written as follows:

$$[A] = \begin{bmatrix} A_{11} & A_{12} & A_{13} & \cdots & A_{1N} \\ A_{21} & A_{22} & A_{23} & \cdots & A_{2N} \\ A_{31} & A_{32} & A_{33} & \cdots & A_{3N} \\ \vdots & \vdots & \vdots & \ddots & \vdots \\ A_{N1} & A_{N2} & A_{N3} & \cdots & A_{NN} \end{bmatrix} \quad (11)$$

$$= \begin{bmatrix} V_{high}-V_{11} & V_{low}-V_{11} & V_{low}-V_{11} & \cdots & V_{low}-V_{11} \\ V_{low}-V_{12} & V_{high}-V_{12} & V_{low}-V_{12} & \cdots & V_{low}-V_{12} \\ V_{low}-V_{13} & V_{low}-V_{13} & V_{high}-V_{13} & \cdots & V_{low}-V_{13} \\ \vdots & \vdots & \vdots & \ddots & \vdots \\ V_{low}-V_{1N} & V_{low}-V_{1N} & V_{low}-V_{1N} & \cdots & V_{high}-V_{1N} \end{bmatrix}$$

It is noted that, in the array type pressure sensing apparatus of the present invention, the piezoresistive units and the standard resistors can be formed simultaneously by printing without additional manufacturing steps so that the manufacturing cost can be reduced. Moreover, the present invention is not limited to the type of the control unit. For example, the control unit can be a micro-controller unit (MCU), a FPGA chip, an ASIC chip or an SoIC embedded chip. Any chip with tri-state logic can be used in the array type pressure sensing apparatus of the present invention.

Figure 6A:
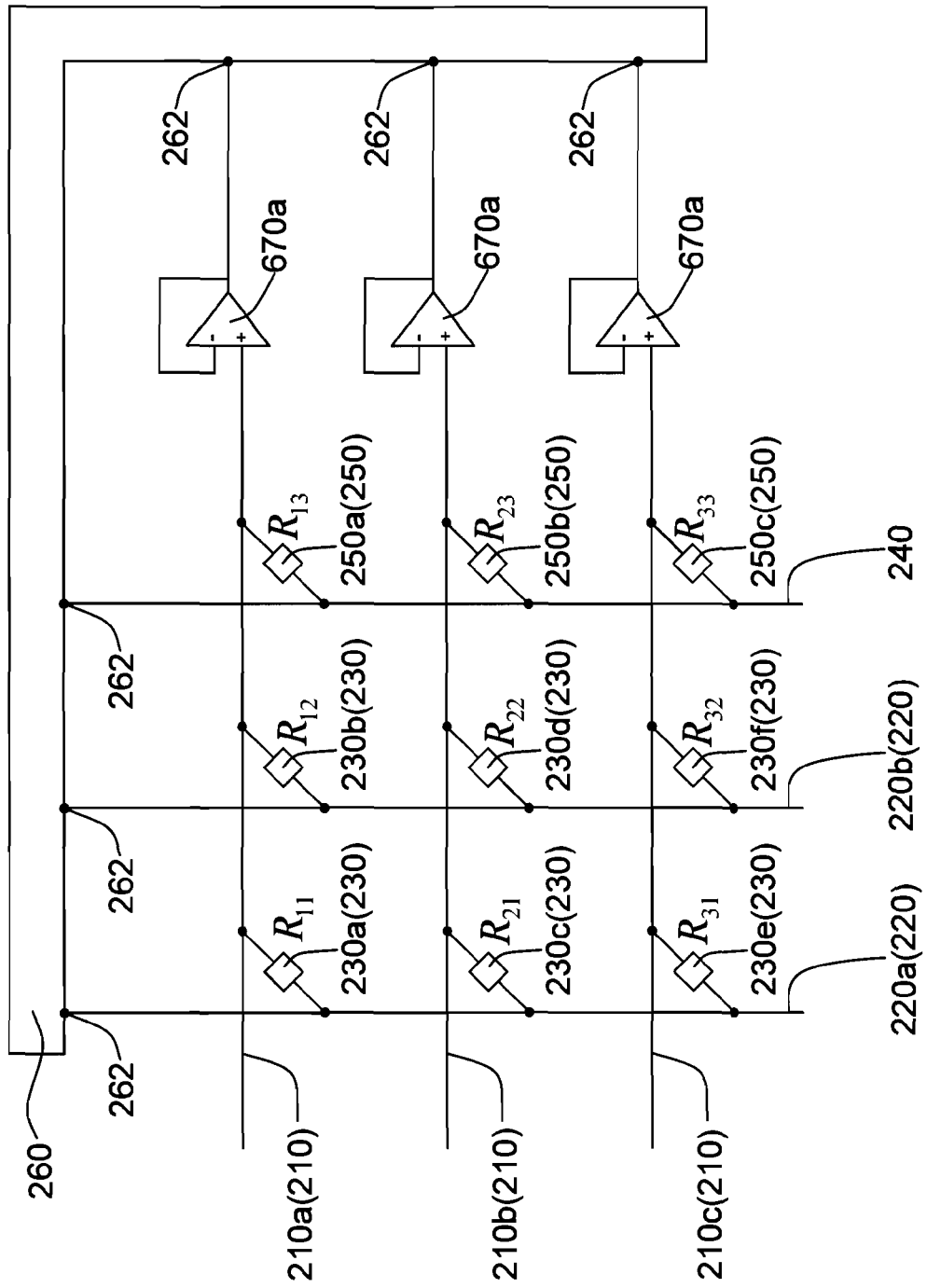
FIG. 6A to FIG. 6D are schematic diagrams of four array type pressure sensing apparatuses according to another embodiment of the present invention.

Moreover, the present invention further comprises read-out circuits so that the control unit further can precisely measure the voltage signals of the corresponding piezoresistive units or standard resistors. FIG. 6A is a schematic diagram of an array type pressure sensing apparatuses according to another embodiment of the present invention. Referring to FIG. 6A, the array type pressure sensing apparatus 600a of the present embodiment is similar to the array type pressure sensing apparatus 200 in FIG. 2 except that the array type pressure sensing apparatus 600a further comprises a plurality of read-out circuits 670a disposed between the first axes 210 and the I/O ports. The read-out circuits 670a can be implemented using amplifiers so that the control unit performs the high impedance input on the first axes 210 more effectively. It is also noted that, with the read-out circuits 670a, both ends of the first axes 210 are connected to the control unit 260, which is easily understood by anyone with ordinary skill in the art. Thus, detailed description is not repeated hereinafter.

Figure 6B:
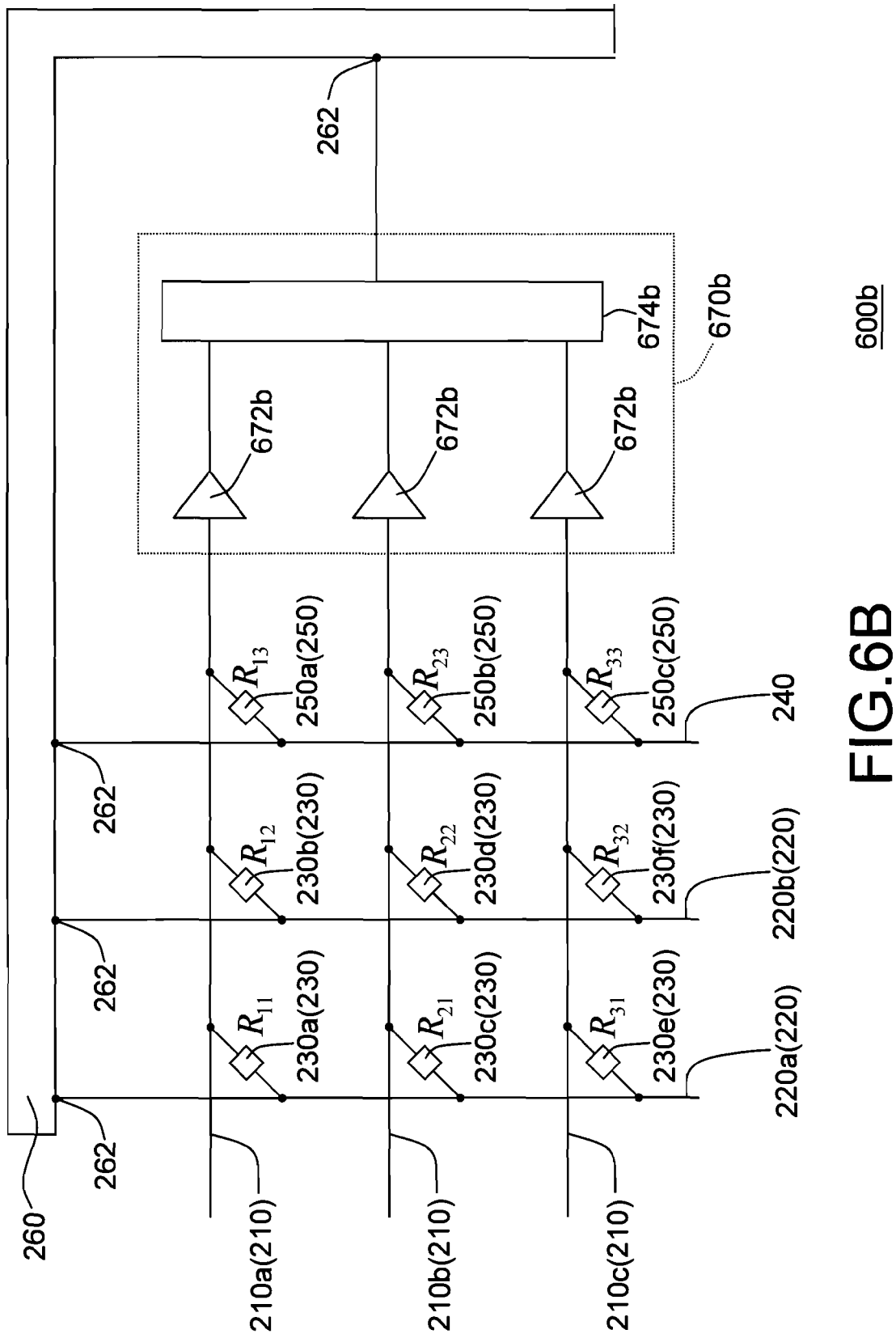

FIG. 6B is a schematic diagram of an array type pressure sensing apparatuses according to another embodiment of the present invention. Referring to FIG. 6B, the array type pressure sensing apparatus 600b of the present embodiment is similar to the array type pressure sensing apparatus 600a in FIG. 6A except that the read-out circuits 670b comprises a plurality of amplifiers 672b and a multiplexer 674b. More particularly, the first axes 210 are coupled to the amplifiers 672b. The amplifiers 672b are coupled to the multiplexer 674b, while the multiplexer 674b is coupled to the control unit 260 by way of the I/O port 262.

Figure 6C:
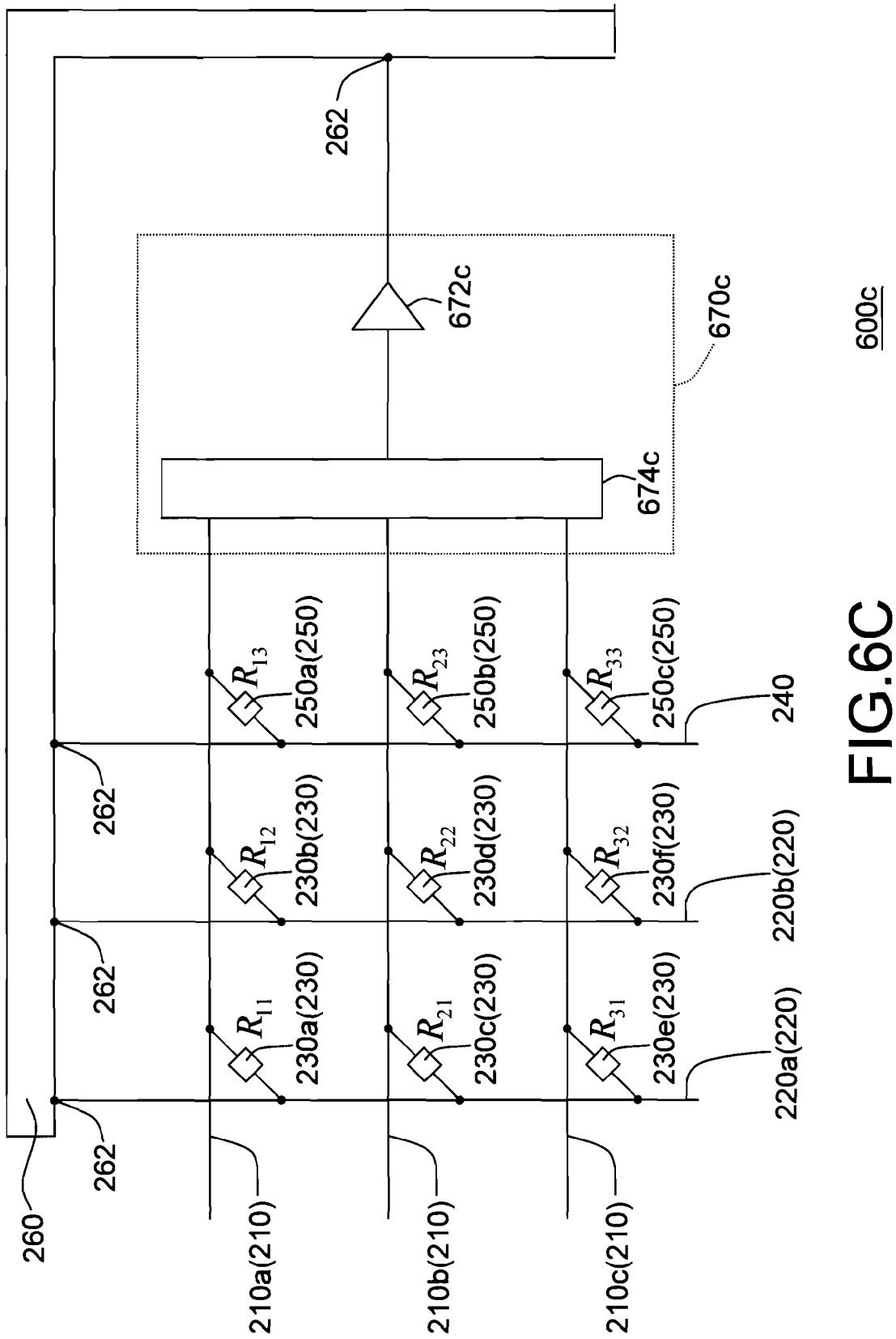
Figure 6D:
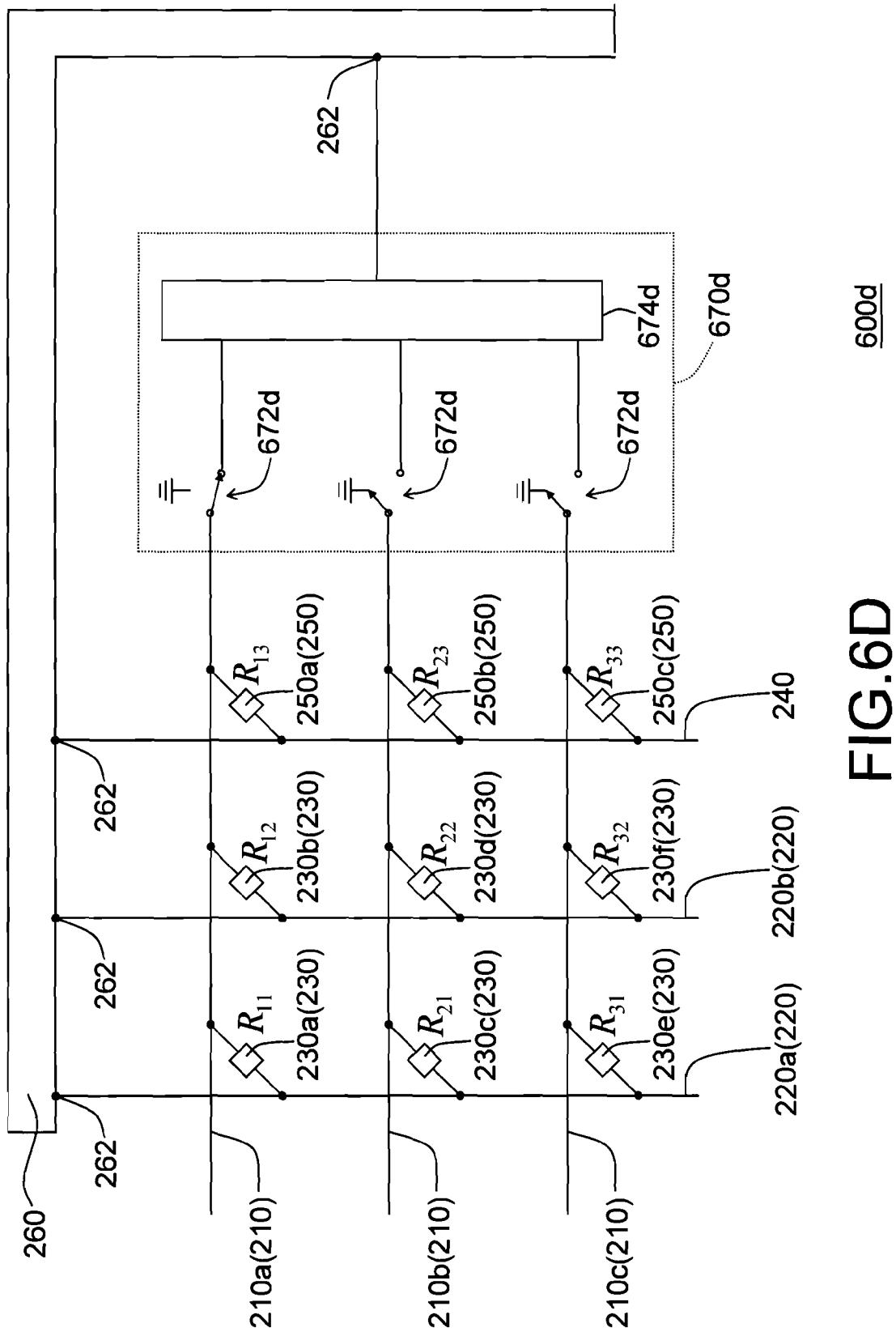

Similarly, FIG. 6C and FIG. 6D are schematic diagrams of two array type pressure sensing apparatuses according to another embodiment of the present invention. Referring to FIG. 6C and FIG. 6D, the array type pressure sensing apparatuses 600c and 600d of present embodiment are similar to the array type pressure sensing apparatus 600b in FIG. 6B except that the read-out circuit 670c in FIG. 6C comprises an amplifiers 672c and a multiplexer 674c, while the read-out circuit 670d in FIG. 6D comprises a plurality of switches 672d and a multiplexer 674d.

In FIG. 6C, the first axes 210 are coupled to the multiplexer 674c, which is further coupled to the amplifier 672c. The amplifier 672c is coupled to the control unit 260 by way of the I/O port 262. In FIG. 6D, the amplifiers 672b in FIG. 6B are replaced by the switches 672d. The switches 672d function as a many-to-one switching device so that the control unit 260 can control the many-to-one switching device by the smaller-number I/O ports to further control the larger-number first axes 210. Moreover, the switches 672d conduct one of the first axis 210 to be driven. In FIG. 6D, for example, the first axis 210a is conducted, while the remaining first axes 210b and 210c are grounding.

Figure 7A:
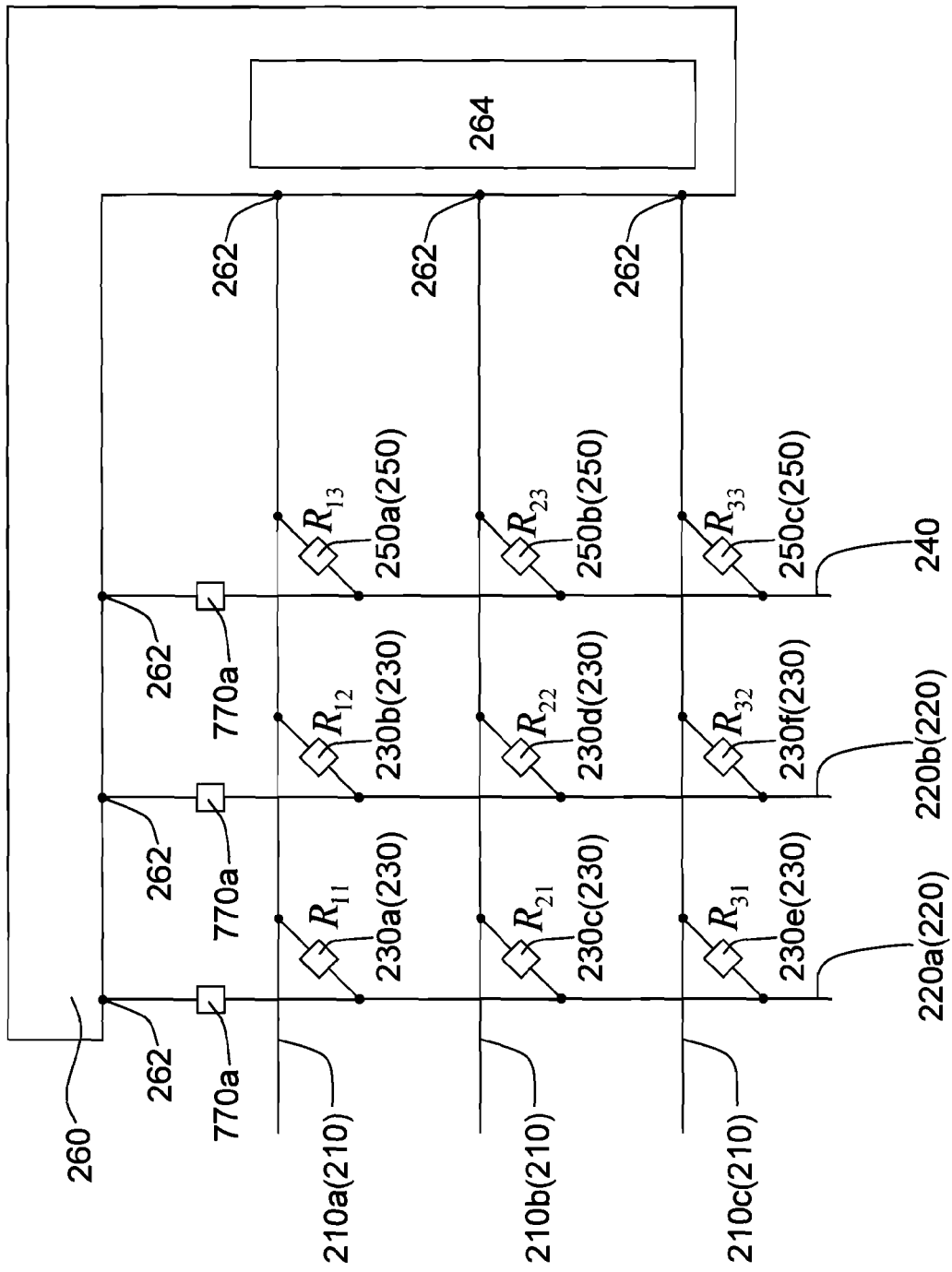
FIG. 7A and FIG. 7B are schematic diagrams of two array type pressure sensing apparatuses according to another embodiment of the present invention.

It is noted that, in the previous embodiments, buffer circuits can be added between the second axes 220 and the control unit 260 to enhance the drivability of the I/O ports 262 of the control unit 260. As shown in FIG. 7A, the array type pressure sensing apparatus 700a further comprises a plurality of buffer circuits 770a between the second axes 220 and corresponding I/O ports 262. Furthermore, a buffer circuit 770a is disposed between the third axis 240 and a corresponding I/O port 262. In the present embodiment, the buffer circuits 770a can be implemented by large current driving devices or driving circuits such as transistors, buffer ICs, or constant current circuits, which are easily understood by anyone with ordinary skill in the art. Thus, detailed description thereof is not repeated hereinafter. Moreover, these buffer circuits can be embedded in the control unit 260. The buffer driving circuit 770b of the array type pressure sensing apparatus 700b in FIG. 7B is an example.

Figure 7B:
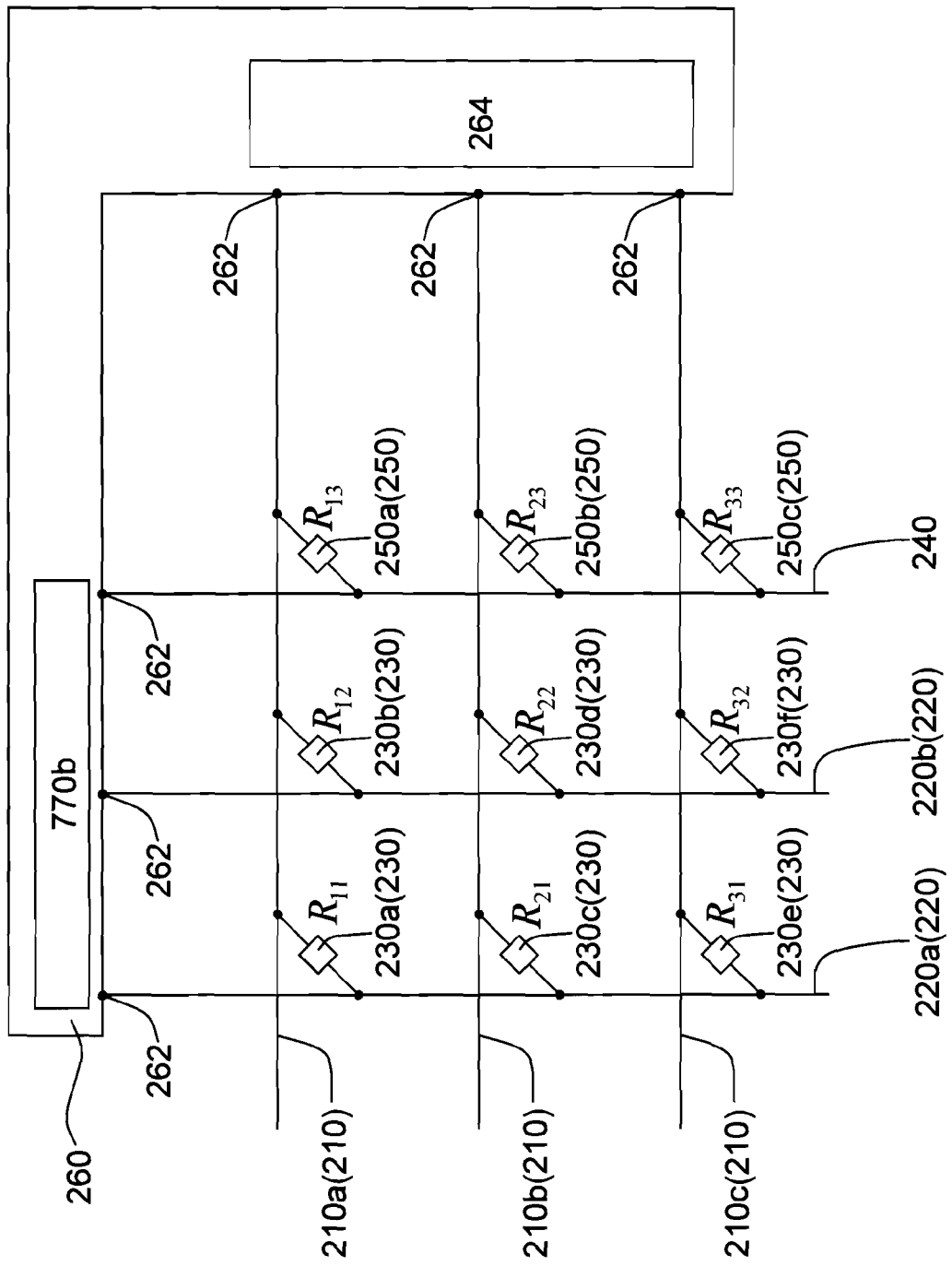

It is noted that, in FIG. 7A and FIG. 7B, the control unit 260 can also comprise an analog-to-digital converter 264 so as to convert the analog voltage signal into digital values for numerical calculation, which is easily understood and can be modified, within the scope of the present invention, by anyone with ordinary skill in the art according to previous description.

Therefore, the array type pressure sensing apparatus and the pressure measurement method thereof according to the present invention exhibit at least the following advantages:

1. According to the present invention, the calculated resistance value has an error within 5%. By using the scanning and driving method of the present invention, the size of the array type pressure sensing apparatus can be enlarged. Moreover, by improving the precision of the standard resistors (with error less than 1%), the error in resistance values of the piezoresistive units can be minimized.

2. The set of piezoresistive simultaneous equations in the present invention can be represented by N-dimensional first-degree polynomial equations. The solution can be obtained with ease to save time in operation of the micro-processor or micro-controller unit (MCU). More particularly, the set of piezoresistive simultaneous equations can be represented by a matrix to be solved by Gaussian elimination to achieve standard calculation.

3. When one first axis is scanned, the resistance values of the piezoresistive units corresponding to the first axis can be calculated to achieve real-time operation, unlike the prior art wherein all the rows of axes are scanned before further calculation.

4. The piezoresistive units and the standard resistors can be simultaneously manufactured without additional processing to reduce cost.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A pressure measurement method suitable for pressure sensing using the array type pressure sensing apparatus comprising:
    a plurality of first axes;
    a plurality of second axes, being disposed crisscross with the first axes;
    a plurality of piezoresistive units, one of which being disposed on the cross between one first axis and one second axis, capable of exhibiting different resistance values when being applied with different pressures;
    a third axis, being disposed crisscross with the first axes;
    a plurality of standard resistors, one of which being disposed on the cross between one first axis and the third axis, capable of exhibiting a constant resistance value when being applied with different pressures; and
    a control unit, having a plurality of I/O ports respectively coupled to the first axes, the second axes and the third axis, through which the control unit performs a tri-state logic scanning and driving process on the first axes, the second axes and the third axis; the pressure measurement method comprising:
    measuring voltage signals of the piezoresistive units and the standard resistor corresponding to each first axis;
    forming a voltage dividing matrix comprising the voltage signals of the piezoresistive units and the standard resistor corresponding to each first axis;
    forming a conductance matrix comprising inverses of resistance values of the piezoresistive units and the standard resistor, resulting in a product of the voltage dividing matrix and the conductance matrix being a zero matrix to form a set of piezoresistive simultaneous equations; and
    solving the set of piezoresistive simultaneous equations to acquire the resistance values of the piezoresistive units.

2. The pressure measurement method as recited in claim 1, wherein the step of measuring the voltage signals of the piezoresistive units corresponding to each first axis comprises:
    performing a high impedance input on the scanned first axis and a low level output on the remaining first axes; and
    performing a high level output on one second axis and the low level output on the remaining second axes and the third axis to measure the divided voltage signal of the piezoresistive unit corresponding to the second axis using the scanned first axis.

3. The pressure measurement method as recited in claim 1, wherein the step of measuring the voltage signals of the standard resistor corresponding to each first axis comprises:
    performing a high impedance input on the scanned first axis and a low level output on the remaining first axes; and
    performing a high level output on the third axis and the low level output on the second axes to measure the voltage signal of the standard resistor using the scanned first axis.

4. The pressure measurement method as recited in claim 2, wherein the low level output is grounding.

5. The pressure measurement method as recited in claim 1, wherein the set of piezoresistive simultaneous equations are solved by Gaussian elimination, Gaussian-Jordan elimination or iteration.

6. The pressure measurement method as recited in claim 1, wherein the number of the second axes is N−1, the voltage dividing matrix is an N×N matrix and the conductance matrix is an N×1 matrix.

7. The pressure measurement method as recited in claim 3, wherein each entry in the ith row in the voltage dividing matrix is represented by $A_{ij}$ with i between 1~N−1, j between 1~N, so that entry $A_{ij}$ represents the negative voltage signal of the piezoresistive unit corresponding to the second axis in the jth column when j is not equal to i and, entry $A_{ii}$ represents the voltage signal of the high level output minus the voltage signal of the piezoresistive unit corresponding to the second axis in the ith column when j is equal to i.

8. The pressure measurement method as recited in claim 6, wherein each entry in the Nth row in the voltage dividing matrix is represented by $A_{Nj}$ with j between 1~N, so that entry $A_{Nj}$ represents the negative voltage signal of the standard resistor when j is not equal to N and, entry $A_{NN}$ represents the voltage signal of the high level output minus the voltage signal of the standard resistor when j is equal to N.

9. The pressure measurement method as recited in claim 6, wherein each entry in the conductance matrix is represented by $X_i$ with i between 1~N, so that entry $X_i$ represents the inverse of the resistance value of the piezoresistive unit corresponding to the second axis in the ith row when i is not equal to N and, entry $X_N$ represents the inverse of the resistance value of the standard resistor when i is equal to N.

10. The pressure measurement method as recited in claim 3, wherein the low level output is grounding.

* * * * *